June 22, 1937.  D. T. BRADLEY  2,084,761

COUPLING

Filed Nov. 1, 1935

INVENTOR.
DAN T. BRADLEY
BY
Kwis Hudson & Kent
ATTORNEYS

Patented June 22, 1937

2,084,761

UNITED STATES PATENT OFFICE 2,084,761

COUPLING

Dan T. Bradley, Detroit, Mich., assignor to Harris Products Company, Akron, Ohio, a corporation of Ohio Application November 1, 1935, Serial No. 47,845

9 Claims. (Cl. 64—11)

This invention relates to flexible couplings for rotating members or members which are otherwise movable.

It is one of the objects of the invention to provide a coupling of relatively low cost that will be efficient in operation, capable of transmitting power from one moving member to the other even though the members are out of alignment to a substantial degree. A further object of the invention is to provide a coupling that will yieldingly transmit motion from one member to the other and thereby permit restricted relative movements of the members.

A further object of the invention is to provide a coupling for transmitting power from one rotating member or shaft to another, which will serve as an electrical insulator and be applicable to shafts without the use of keys or other means for positively locking the coupling to either of the shafts.

Other objects of the invention and the features of novelty will be apparent from the following description taken in connection with the accompanying drawing in which various forms of couplings, embodying my invention, are illustrated.

Figure 1:
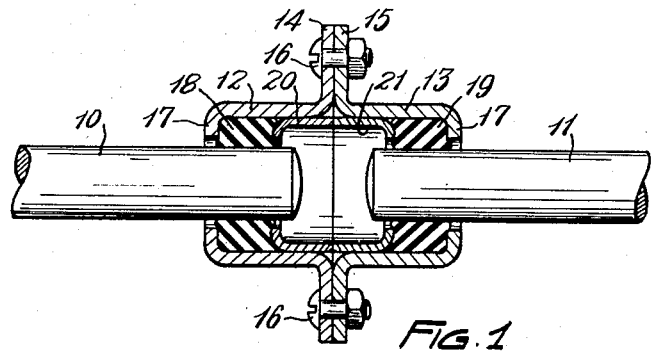
Fig. 1 is a longitudinal section through a flanged coupling that is especially applicable for drives which transmit a relatively small amount of horse-power.

Referring to Fig. 1, 10 indicates one member or shaft and 11 the other and these members may vary in diameter and be somewhat out of alignment through the axis of one member being laterally displaced from the other or arranged at an angle thereto. The coupling consists of two housing members 12 and 13 which are preferably made as stampings, and these housings have laterally extending flanges 14 and 15 which are in abutting relation and connected by a suitable number of bolts 16. Each of the housing members 12 and 13 has an inturned flange 17 at its outer end. Within the outer end portion of the housing member 12 there is a rubber bushing 18 which engages the inner side of the flange 17 and has its outer circumference in engagement with the inner surface of the housing member 12, and its inner circumference in engagement with the member 10. In a similar manner the housing member 13 has a rubber bushing 19 which engages the member 11 and the interior of the housing member 13. Between the bushings 18 and 19 there is a spacer which is shown as made up of the two cuplike stampings 20 and 21, the inner ends of which are in engagement and the outer ends are provided with inturned flanges which engage the inner ends of the bushings 18 and 19. The bushings 18 and 19 are preferably made slightly longer, in the axial direction, than shown in Fig. 1, so that when the parts are assembled and the bolts 16 tightened the rubber bushings 18 and 19 will be compressed axially and frictionally engage the members 10 and 11 and the inner surfaces of the housing members 12 and 13 so tightly that there will be no circumferential slipping of the bushings relative to the members 10 and 11 or the housing members 12 and 13. The spacer members 20 and 21 are slidable in the housing members 12 and 13 so that the compression forces on the rubber bushings will be uniform.

Because of the flexibility of the bushings 18 and 19 the members 10 and 11 will be yieldingly connected and are therefore adapted for restricted relative movement and, in cases where the members 10 and 11 are out of alignment, the movement of one of these members relative to the other will be accommodated by either torsional or radial flexing of the bushings or a combination thereof.

Figure 2:
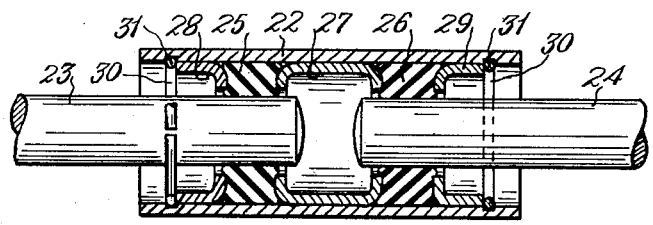
Fig. 2 is a longitudinal section of a plain cylindrical coupling.

In the form of the invention illustrated in Fig. 2, there is a tubular housing member 22 surrounding the end portions of the members 23 and 24 which are to be coupled together. Within the housing 22 there are rubber bushings 25 and 26 between which there is a spacer 27. The collars 28 and 29 are fitted into the outer ends of the housing 22 and bear against the ends of the bushings 25 and 26. When the parts of the coupling are assembled, the collars 28 and 29 are forced into the housing 22 to provide the requisite compression of the bushings 25 and 26, and snap rings 30 are then inserted in grooves 31 on the interior of the housing to hold the collars in position as shown. As will be readily understood, the compression of the bushings 25 and 26 causes them to tightly adhere to the members 23 and 24 and to the inner surface of the housing 22.

Figure 3:
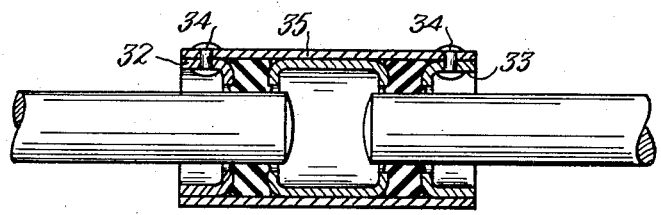
Fig. 3 is a similar view illustrating a modification of the construction illustrated in Fig. 2.

In the form illustrated in Fig. 3, the construction is similar to that in Fig. 2, with the exception that the collars 32 and 33, which are similar to the collars 28 and 29, are held in position by screws or rivets 34 instead of the snap rings 30. A tubular housing 35, similar to the housing 22, is employed and it will be noted that, because of the cylindrical form of these housings, either of these couplings is adapted to serve as a pulley for a flat belt.

Figure 4:
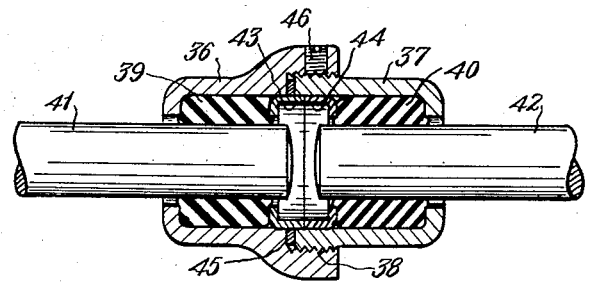
Fig. 4 is a longitudinal section of another form of coupling.
Figure 5:
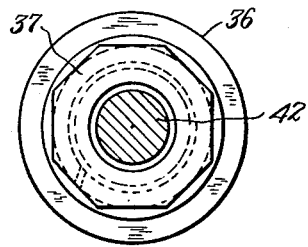
Fig. 5 is an end elevation thereof.

The form illustrated in Figs. 4 and 5 is especially adapted for the transmission of small amounts of power and for applications in which a coupling of minimum cost is required. The housing members 36 and 37 have a screw threaded connection 38 and, for convenience, the exterior surfaces of these housing members are preferably made polygonal so that they will be adapted to be coupled and uncoupled by means of wrenches. The rubber bushings 39 and 40 engage the outer surfaces of the shaft members 41, 42, respectively, and the interior surfaces of the housing members 36 and 37. A spacer consisting of the two cup-like parts 43 and 44 engages the inner ends of the bushings 39 and 40 so that when the housing members 36 and 37 are screwed together the requisite compression of the rubber bushings 39 and 40 will be effected. In order to hold the housing members 36 and 37 against relative turning, a lock washer 45 may be employed. A set screw 46 may also be used if desired, or any other suitable means may be used for holding the housing members against relative turning.

In the construction illustrated in Figs. 4 and 5, the parts of each half of the coupling will be assembled on the shaft that it is associated therewith, and the housing members are then screwed together. Assuming that, in this operation, the housing member 36 is held by a wrench and the housing member 37 is rotated, the engagement of the rubber bushing 40 with the shaft 42 and the collar 44 will cause these parts to be rotated with the housing member 37, and the parts associated with the housing member 36 will be held stationary because of their engagement with the rubber bushing 39. Thus the spacer member 44 will rotate on the spacer member 43 and there will be no slipping of either of the rubber bushings, relative to the parts which it engages, when the housing members are screwed together.

While the forms of the invention which I have illustrated and described are especially applicable as couplings, for rotating parts, any of these constructions is also adapted to serve as a means for connecting parts which move endwise or have a combined endwise and rotary movement.

While I have illustrated and described what I now consider to be the preferred forms of my invention, it will be evident to those skilled in the art that various changes may be made in the details of construction without departing from the spirit of the invention as defined in the appended claims.

Having thus described my invention, what I claim is:

1. A power-transmitting coupling for connecting two rotatable members, comprising a housing, bushings of flexible material adapted to frictionally engage each of said members, a spacer axially movable within said housing and having its opposite ends engaging the inner ends of said bushings, said housing having abutments therein engaging the outer ends of said bushings, said abutments being axially movable relative to said spacer to compress said bushings so that the latter will have substantially non-slipping engagement with said members and the interior of said housing, and means for retaining said abutments in the position in which said bushings are so compressed.

2. A power-transmitting coupling for connecting two rotatable members, comprising a plurality of housing parts, bushings of flexible material adapted to frictionally engage each of said members, a spacer axially movable within said housing parts and having its opposite ends engaging the inner ends of said bushings, said housing parts having abutments therein engaging the outer ends of said bushings, and means for drawing said housing parts together to compress said bushings so that the latter will have substantially non-slipping engagement with said members and the interior of said housing parts.

3. A power-transmitting coupling for connecting two rotatable members, comprising a plurality of housing parts, bushings of flexible material adapted to frictionally engage each of said members, a spacer axially movable within said housing parts and having its opposite ends engaging the inner ends of said bushings, said housing parts having abutments therein engaging the outer ends of said bushings, and said housing parts having cooperating screw threads whereby they are adapted to be drawn together to compress said bushings so that the latter will have substantially non-slipping engagement with said members and the interior of said housing parts.

4. A power-transmitting coupling for connecting two rotatable members, comprising a plurality of housing parts having a screw thread connection therebetween, bushings of flexible material adapted to frictionally engage said members, a spacer comprising a plurality of relatively rotatable parts axially movable within said housing parts, the opposite ends of said spacer engaging the inner ends of said bushings, and said housing parts having abutments therein engaging the outer ends of said bushings.

5. A power-transmitting coupling for connecting two rotatable members, comprising a tubular housing surrounding the ends of said members, bushings of flexible material fitting the interior of said housing and adapted to frictionally engage said members, a spacer axially movable within said housing and having its opposite ends engaging the inner ends of said bushings, collars fitting in the ends of said housing and engaging the outer ends of said bushings, said collars being movable to axially compress said bushings, and means for securing said collars in the position in which said bushings are compressed.

6. A power-transmitting coupling for connecting two rotatable members, a plurality of parts forming a housing, a plurality of hollow bushings of flexible material fitting within said housing parts, a spacer axially slidable within said housing parts and having its opposite ends engaging the inner ends of said bushings, said housing parts having abutments therein engaging the outer ends of said bushings, and means for drawing said housing parts together to effect axial compression of said bushings.

7. In a device for transmitting power, a housing adapted to receive a power-transmitting belt, rotatable power-transmitting means on which said housing is flexibly mounted, said flexible mounting for said housing comprising a hollow rubber bushing surrounding said means and having its periphery fitting the interior of said housing, annular abutments within said housing and spaced from said means and engaging the ends of said bushing, and means for holding said abutments in position with said bushing under axial compression and in frictional engagement with said housing and the first-mentioned means.

8. In a device for transmitting power, a housing adapted to receive a power-transmitting belt, rotatable power-transmitting means on which said housing is flexibly mounted, said flexible mounting for said housing comprising a pair of hollow rubber bushings surrounding said means and having their periphery fitting the interior of said housing, said housing having internal abutments engaging the outer ends of said bushings, a spacer between the inner ends of said bushings, and means for holding said abutments in such spaced relation that said bushing is under axial compression and in substantially non-slipping frictional engagement with said housing and the first-mentioned means.

9. In a device for transmitting power, a housing member, rotatable power-transmitting means on which said housing member is flexibly mounted, said flexible mounting for said housing member comprising a hollow rubber bushing surrounding said means and having its periphery fitting the interior of said housing, annular abutments within said housing and spaced from said means and engaging the ends of said bushing, one of said abutments being axially movable within said housing, a second rotatable power-transmitting means, and means mounted on the latter means and having a screw thread connection with said housing member for effecting relative axial movement of said abutments and thereby axially compress said bushing.

DAN T. BRADLEY.